C. C. EVANS.
VULCANIZER.
APPLICATION FILED JAN. 22, 1907.

1,023,727.

Patented Apr. 16, 1912.
2 SHEETS—SHEET 1.

WITNESSES

INVENTOR
CULLEN C. EVANS
BY Paul & Paul
HIS ATTORNEYS

COLUMBIA PLANOGRAPH CO., WASHINGTON, D. C.

C. C. EVANS.
VULCANIZER.
APPLICATION FILED JAN. 22, 1907.

1,023,727.

Patented Apr. 16, 1912.

2 SHEETS—SHEET 2.

WITNESSES
A. W. Walstrom
J. K. Baldwin

INVENTOR
CULLEN C. EVANS
BY Paul & Paul
HIS ATTORNEYS

UNITED STATES PATENT OFFICE.

CULLEN C. EVANS, OF MINNEAPOLIS, MINNESOTA.

VULCANIZER.

1,023,727.  Specification of Letters Patent.  Patented Apr. 16, 1912.

Application filed January 22, 1907. Serial No. 353,552.

*To all whom it may concern:*

Be it known that I, CULLEN C. EVANS, of Minneapolis, Hennepin county, Minnesota, have invented certain new and useful Improvements in Vulcanizers, of which the following is a specification.

My invention relates to devices for vulcanizing rubber, adapted for use particularly on automobile tires, and the object of the invention is to provide an improved form of heater capable of use on a flattened tire or one that is on the wheel.

A further object is to provide improved means for controlling the heating agent, in this case an electric current, whereby a uniform degree of heat can be maintained in the heater.

The invention consists generally in various constructions and combinations, all as hereinafter described and particularly pointed out in the claims.

Figure 1:
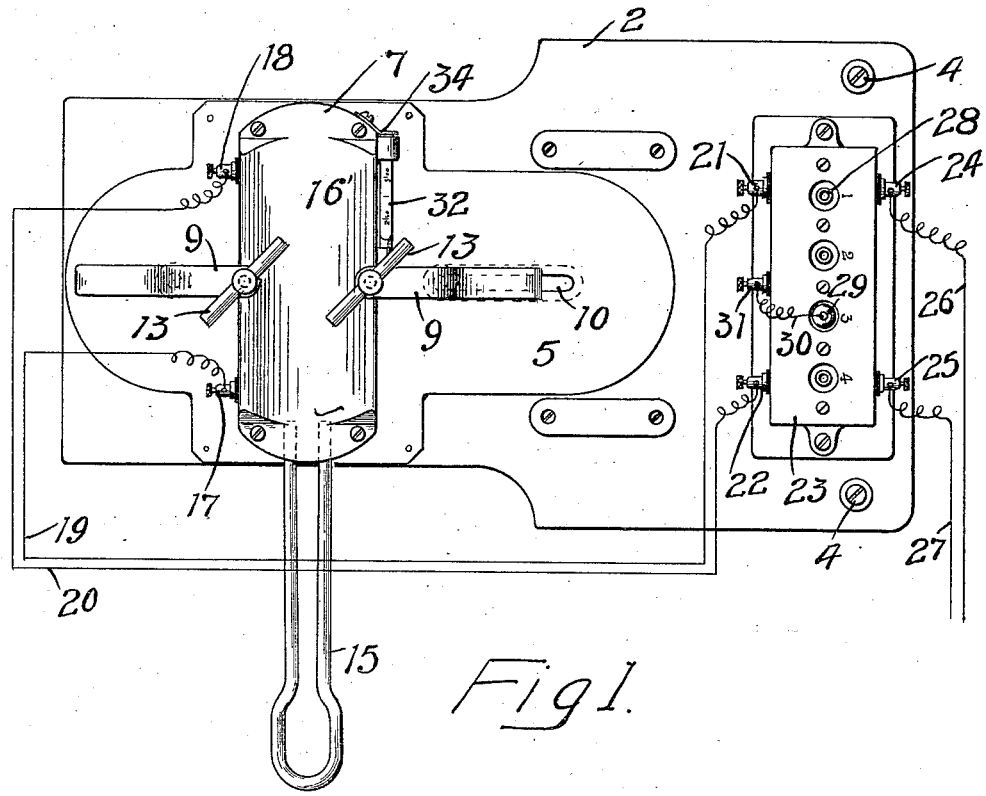
Figure 2:
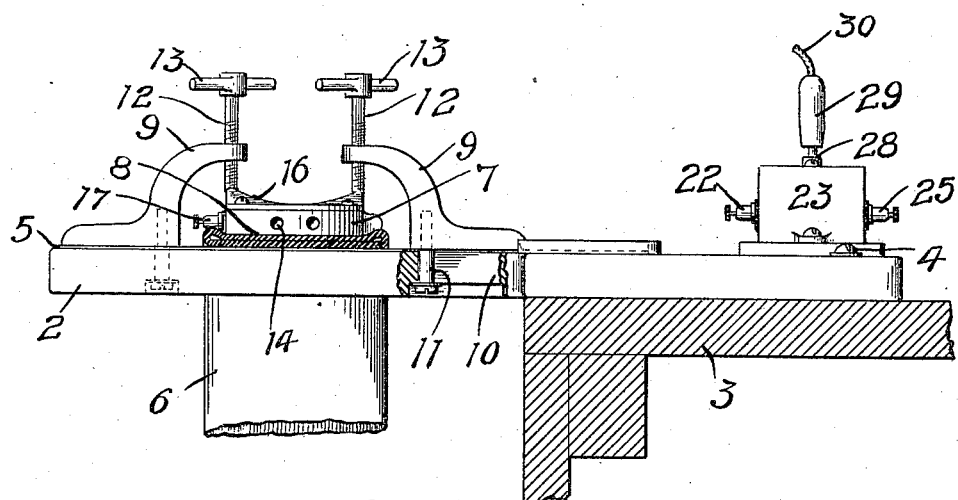
Figure 3:
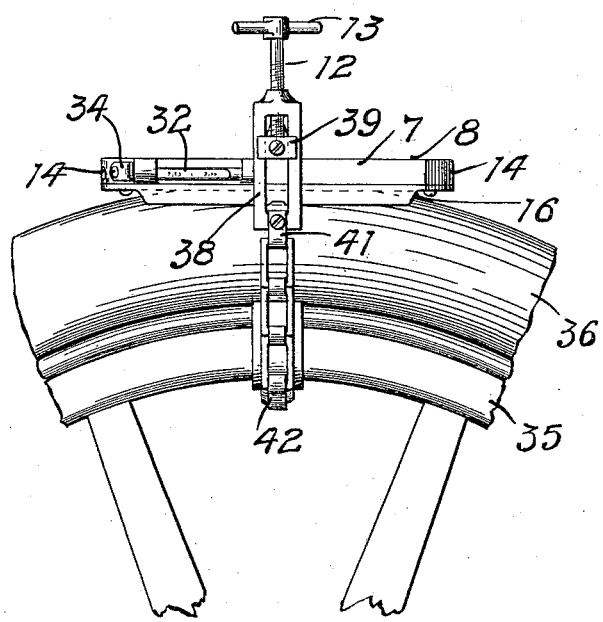
Figure 4:
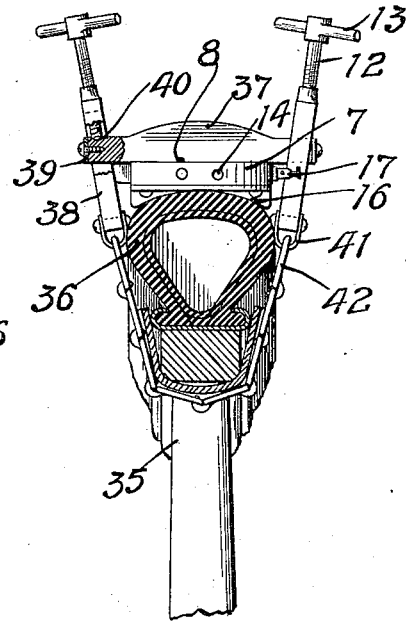
Figure 5:
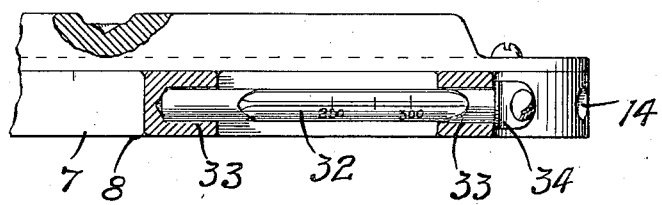

In the accompanying drawings, forming part of this specification, Figure 1 is a plan view of a vulcanizing apparatus embodying my invention. Fig. 2 is an edge view of the board whereon the vulcanizing device is mounted, showing the position of the parts thereon. Fig. 3 illustrates the application of the device to a tire without removing the tire from the wheel. Fig. 4 is a transverse sectional view of the same. Fig. 5 is an edge view of the heater showing the position of the thermometer thereon.

In the drawing, 2 represents a suitable board whereon the apparatus is arranged for convenience in handling, said board being usually secured to a bench or table 3 by screws 4 or other suitable means. The end of the board projects beyond the bench, as shown in Fig. 2, to allow a pneumatic tire to be placed thereon. A metallic bed plate 5 is preferably provided on the end of the board 2 and upon this bed plate the deflated tire is laid. The heater 7 has a flat surface 8 on one side that is adapted to bear on the tire, and is pressed thereon by suitable clamping devices consisting preferably in this instance, of brackets 9 adjustably mounted in a slot 10 by means of a screw 11 to admit the tires between the brackets. Suitable pressure screws 12 having an operating handle 13 are mounted on the brackets 9. The heater has sockets 14 in one end for a removable handle 15, and on the opposite side from the face 8 is provided with a shoe 16 having a concave surface 16' designed to fit the periphery of a tire without removing it from the wheel. The shoe is removably secured to the heater and another shoe having a different concave may be substituted for the one shown when it is desired to vulcanize a different size of tire.

The heater is provided interiorly with suitable resistance, (not shown), to which I make no claim in this application, and binding posts 17 and 18 are provided near the ends of the heater having conductors 19 and 20 leading respectively to posts 21 and 22 on a controller 23 also mounted on said board. Binding posts 24 and 25 are provided on said controller to which the terminals 26 and 27 of an electric circuit are connected. A series of sockets 28 are provided in the top of the controller, adapted to receive a plug 29 that has a conductor 30 leading to a binding post 31. The insertion of the plug into one of the sockets closes the circuit through the controller and the heater, the intensity of the current depending upon the socket into which the plug is inserted.

In practice the plug will be inserted into the socket marked number 1 and when the desired degree of heat is reached it may be removed and thrust into number 3, whereupon an even degree of temperature will be maintained in the heater without any attention as long as it is desired in the vulcanizing operation. A thermometer 32 is rotatably mounted in sockets 33 on the heater, being held against premature rotation by a spring device 34. The thermometer can be readily turned in its sockets so that it can be read from either side of the heater.

In Figs. 3 and 4 I have shown a portion of a wheel 35, and a tire 36 thereon, in an inflated condition or partially so. To vulcanize a certain area of the periphery of this tire the concave face of the heater is laid thereon, as indicated in Figs. 3 and 4, and a bar 37 is placed transversely of the heater on its flattened side, the ends of the bar projecting a sufficient distance beyond the edges of the heater to allow links 38 to be slipped thereon, plates 39 engaging said links and preventing their accidental separation. Pressure screws similar to those heretofore described are mounted on the ends of the links and adapted to bear on sockets 40 in the ends of the bar 37. Loops 41 are provided at the lower ends of the links and a chain 42 or other flexible means connects said loops with one another, and passes around the rim of the wheel between it and the hub, so that when the pressure screws are tightened the chain will bear on the rim and the heater will be clamped firmly on the tire. The current is then turned on in the manner described with reference to the board in Fig. 1. and the vulcanizing operation effected in a similar manner.

I claim as my invention:

1. In a vulcanizer heater having a handle, a shoe removably secured to the heater, links on opposite sides of the heater, a transverse bar supporting the links and removable therein and engaging the outer face of the heater, a chain secured to the links and passing around the rim of the wheel, and screws carried by the links and forcing the transverse bar down and forcing the heater against the tire.

2. In a vulcanizing heater, a shoe removably secured to the heater, links on opposite sides of the heater, a transverse bar passing through the links above the heater, transverse plates secured to the ends of the bar, and holding the links on the bar, a chain secured to the links and passing around the rim of the wheel, and screws carried by the upper ends of the links, and engaging the upper face of the bar for forcing it down upon the heater, and holding the heater on the tire.

3. The combination, with a suitable plate whereon the portion of rubber to be vulcanized is placed, of a heater having a flattened surface to fit upon the rubber to be vulcanized and provided with connections for electric terminals, a bracket adjustably mounted on said plate and movable toward or from said heater, and pressure screws carried by said brackets and arranged to engage said heater to force its surface against the work, substantially as described.

4. The combination with a suitable plate for supporting the rubber to be vulcanized, of a heater having a vulcanizing surface to fit the rubber to be vulcanized and provided with connections for electric terminals, a stationary bracket on the plate on one side of the heater, a bracket adjustably mounted on said plate on the opposite side of the heater, and movable to or from the heater, and separate means carried by the brackets and arranged to engage the heater to force its surface against the work.

5. The combination with a suitable heater, means for clamping the same to the rubber to be vulcanized, said heater having socket in one side, a thermometer rotatably mounted in said socket, and a spring carried by the heater and engaging the thermometer, whereby the same is held in its rotated adjusted position.

6. The combination with a suitable plate for supporting the rubber to be vulcanized, of a heater having a vulcanizing surface to fit the rubber to be vulcanized, a stationary bracket carried by the plate, a bracket horizontally adjustably mounted on said plate on the opposite side of the heater, and means carried by the brackets and adapted to engage the heater to force it down upon the work.

7. The combination with a suitable heater, means for clamping the same to the rubber to be vulcanized, said heater having an open ended socket exposing the thermometer, and a spring carried by the heater and extending across the open end of the socket, and engaging the thermometer, and holding it in the socket and against rotation.

8. The combination with a suitable heater, means for clamping the same to the rubber to be vulcanized, said heater having spaced ears, one ear having a socket and the other ear having an opening therethrough in alinement with the socket, a thermometer in the socket, and extending through the opening in the ear, and a spring secured to the heater and extending across the opening in the ear, and engaging the end of the thermometer and holding it in the ears and against rotation.

9. A vulcanizer having solid flattened surfaces, a shoe fitting one side of the heater, screws passing through the shoe and entering the vulcanizer and removably securing the shoe to the side of the heater, said shoe having a concave face adapted to fit the periphery of the tire and the opposite flat surface of the heater adapted to fit the inner tire tube, and means for securing said heater to the work with either the shoe or flat surface in operative position.

In witness whereof, I have hereunto set my hand this 19th day of January, 1907.

CULLEN C. EVANS.

Witnesses:
RICHARD PAUL,
J. H. BALDWIN.

Copies of this patent may be obtained for five cents each, by addressing the "Commissioner of Patents, Washington, D. C."